United States Patent [19]

Lammerant et al.

[11] Patent Number: 5,383,553
[45] Date of Patent: Jan. 24, 1995

[54] CASE FOR RECEIVING AT LEAST ONE DATA STORAGE DISK

[75] Inventors: Henri Lammerant; Philip Lammerant, both of Thulin, Belgium

[73] Assignee: Cartonneries de Thulin S.A., Thulin, Belgium

[21] Appl. No.: 261,830

[22] Filed: Jun. 17, 1994

[30] Foreign Application Priority Data

Jun. 18, 1993 [DE] Germany .................. 9309103[U]

[51] Int. Cl.⁶ .................................................. B65D 85/57
[52] U.S. Cl. ..................................... 206/309; 206/1.5; 206/807
[58] Field of Search ............ 206/307, 309, 310, 311, 206/312, 313, 444, 1.5, 807

[56] References Cited

U.S. PATENT DOCUMENTS

| | | | |
|---|---|---|---|
| 2,785,797 | 3/1957 | Rice | 206/310 |
| 4,702,369 | 10/1987 | Philosophe | 206/309 X |
| 4,793,480 | 12/1988 | Gelardi et al. | 206/312 |
| 4,805,770 | 2/1989 | Grobecker et al. | 206/312 X |
| 4,867,302 | 9/1989 | Takahashi | 206/309 X |
| 5,259,498 | 11/1993 | Weisburn et al. | 206/309 |
| 5,263,580 | 11/1993 | Ciba et al. | 206/310 X |

FOREIGN PATENT DOCUMENTS

| | | |
|---|---|---|
| 0114631 | 8/1984 | European Pat. Off. . |
| 0420350 | 4/1991 | European Pat. Off. . |
| 9201879 | 2/1992 | Germany . |

*Primary Examiner*—Jacob K. Ackun, Jr.
*Attorney, Agent, or Firm*—Robert M. Becker & Associates

[57] ABSTRACT

A case for receiving at least one data storage disk has a housing with a lid and a base. A support for receiving at least one data storage disk is positioned in the housing. The base has a flat rectangular bottom plate with lateral edges and sidewalls connected to the lateral edges. The lid has a flat rectangular top plate with lateral edges and side walls connected to the lateral edges. The lid and the base are pivotable relative to one another. The pivoting connection is realized by pivot pins connected to the sidewalls of the lid or the base and pivot holes for receiving the pivot pins provided in the sidewalls of the other housing part. The length of the pivot pins is greater than the thickness of the sidewalls with the pivot holes. The pivot pins have a radial enlargement that has a diameter greater than the diameter of the pivot holes. The sidewalls of the lid or the base with the pivot holes have an insertion slot, extending from the upper edge of the respective sidewall to the pivot hole, for introducing the pivot pin into the pivot hole.

5 Claims, 5 Drawing Sheets

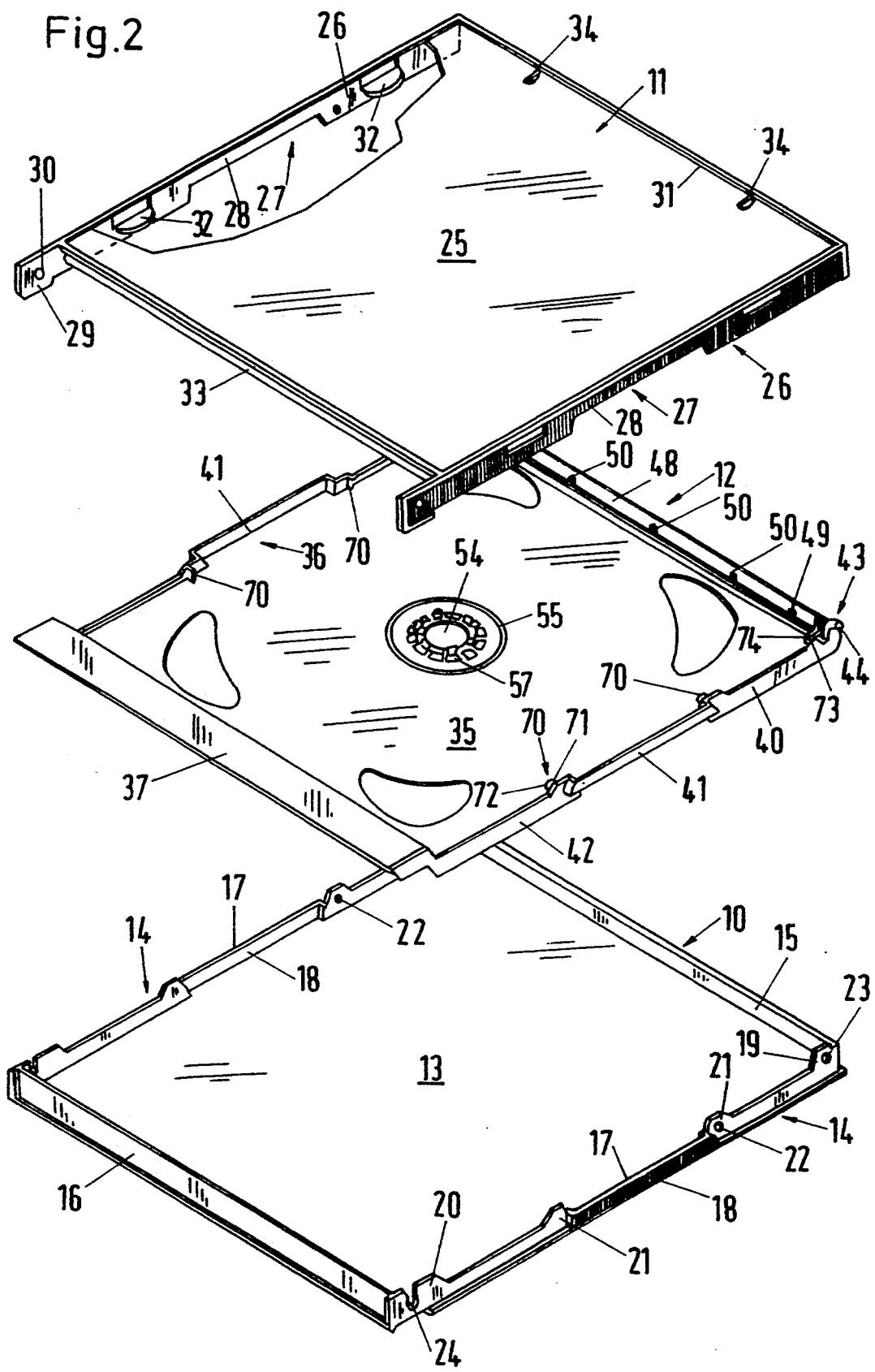

Fig. 5a
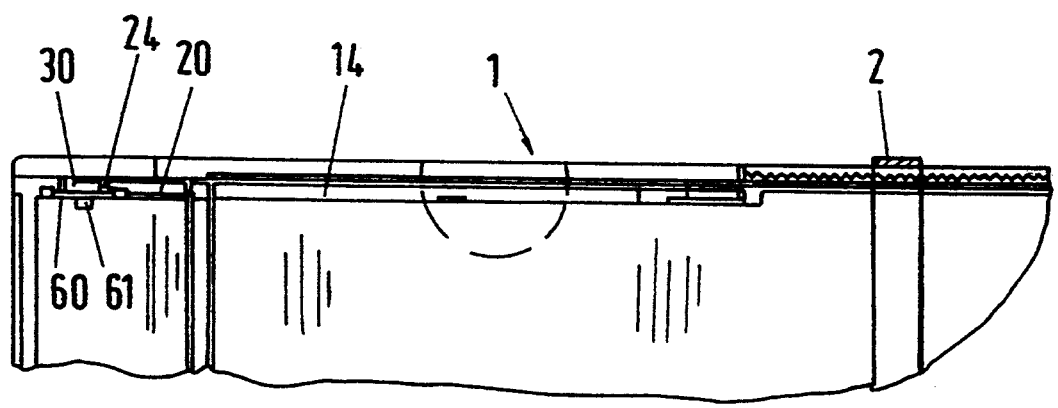
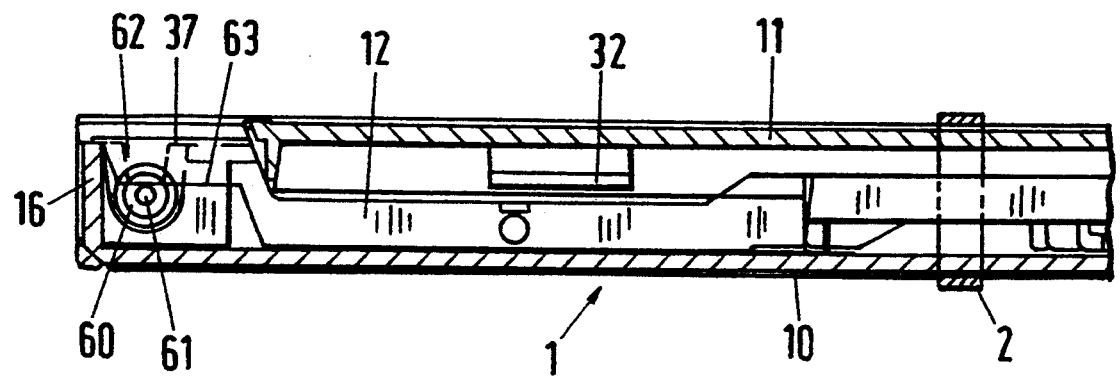
Fig. 5b

CASE FOR RECEIVING AT LEAST ONE DATA STORAGE DISK

BACKGROUND OF THE INVENTION

The present invention relates to a case for receiving at least one data storage disk. The case is comprised of a housing with a support for the data storage disk arranged therein. The housing is comprised of a base and a lid whereby the base and the lid have a substantially flat rectangular bottom plate, respectively, top plate with side walls at their lateral edges. The base and the lid are pivotably connected to one another whereby the means for pivoting is formed by pivot pins on oppositely arranged sidewalls of the base or the lid which engage pivot holes which are provided at the corresponding sidewalls at the respective other part of the housing.

Such cases for receiving data storage disks are, for example, known for receiving, storing, and selling so-called CDs. These known cases are in the form of a housing and the base and the lid are, in general, made of transparent plastic material, whereby the support for the data storage disk which is insertable into the base is, in general, made of a dark colored plastic material.

Various embodiments of such cases are known which, however, are all designed very similarly. In general, the base is provided with a flat rectangular bottom plate and four sidewalls.

Into this base the support for the data storage disk is insertable. Between the support for the data storage disk and the base a cover sheet with pictures can be inserted which cover sheet refers to the data storage disk. This cover sheet extends upward along the rearward and the forward wall so that the title is visible at the edges of a stored case.

The lid, in General, is also provided with a rectangular, substantially square top plate which is somewhat shorter than the base. Two sidewalls are connected to this top plate. They extend to the rear and form elastic arms with pivot pins which engage corresponding pivot holes in the rearward portion of the base and provide a pivoting axis for pivoting the lid relative to the base. In this manner, the lid can be closed or opened over an angle of 180°.

The side walls of the lid are provided with small, semi-circular tongues that extend to the rear so that between the tongues and the top plate it is also possible to insert cover sheets, information sheets etc.

The known embodiments of such cases differ in general in the constructive means for changing the receiving capacity. For this purpose different arrangements of the base, the lid, and the support are suggested. The support is essentially a rectangular, formed piece which is insertable into the base. In the center of the support a bore is provided which corresponds to the center hole of the data storage disk. Concentric to this bore a slightly elevated small disk is provided that forms a support surface for the circular inner area of the disk which area does not have information stored thereon. In this manner the area of the disk on which information is stored thus floats freely on the circular receiving element of the support so that no contact and no friction between the parts of the disk on which information is stored and the packaging is possible. About the bore of the support segment cutouts are provided which have hooks for engaging or catching the edge of the center hole of the plate.

For receiving a plurality of CDs a multi storage case is suggested. Such multi storage cases are, for example, known from European publication 114 631, European publication 420 350 and German Gebrauchsmuster 92 01 879.

In all known case embodiments the two sidewalls of the lid extend to the rear and form elastic arms with pivot pins which pivot pins, when the elastic arms are slightly bent outwardly, can engage, due to their elasticity, corresponding pivot holes in the sidewalls of the base so that a pivoting axis for pivoting the lid relative to the base is formed.

For selling such known CD cases it is necessary to provide a safety means in order to ensure that the customer indeed buys an unopened CD case, respectively, in order to ensure that the original CD placed into the case is still present in the case. Such safety means also serve as anti-theft devices. In the past the entire CD cases have been enclosed in a cellophane wrap; however, at present, in view of environmental considerations, other kinds of safety means have been suggested. For example, a tape in the form of a narrow band is positioned about the CD case such that it can no longer be opened. For this purpose, the tape is guided tightly about the CD case and the ends are connected. The tape extends parallel to the pivoting axis on the top portion and the bottom portion of the case. In the alternative, the (adhesive) tape is applied transverse to the pivoting axis of the top and the base.

The known tape arrangement has been successfully used for the purpose of ensuring that the original CD is still present as well as for complying with environmental considerations. However, it does not provide a sufficient anti-theft device. Due to the design of the pivot between the lid and the base it is possible, despite the presence of the applied tape, to displace the elastic arms of the lid relative to the base and to displace the entire lid relative to the base without lifting the lid of the base. The tape is not damaged during this displacement. The CD can be removed from the case when the base and the lid are displaced relative to one another to a certain extent. The lid can be returned into its initial position and the pivot pins at the elastic arms can be reinserted into the corresponding pivot holes within the base. Due to the information and cover sheets arranged at the base and the lid, it is impossible to determine despite the tape whether the case is empty or contains an unwanted CD.

It is therefore an object of the present invention to improve a case of the aforementioned kind for data storage disks such that a detachment of the pivot between the lid and the base is impossible when the case is closed.

SUMMARY OF THE INVENTION

The case for receiving at least one data storage disk according to the present invention is primarily characterized by:

A housing comprised of a lid and a base;

A support, for receiving at least one data storage disk, positioned in the housing;

The base having a substantially flat rectangular bottom plate with lateral edges and sidewalls connected to the lateral edges of the bottom plate;

The lid having a substantially flat rectangular top plate with lateral edges and sidewalls connected to the lateral edges of the top plate;

The housing further comprising a pivoting connection for pivoting the lid and the base relative to one another, the pivoting connection comprised of pivot pins connected to the sidewalls of one of the lid and the base and pivot holes, for receiving the pivot pins, positioned in the sidewalls of the other of the lid and the base;

Wherein a length of the pivot pins is greater than a thickness of the sidewalls of the other of the lid and the base;

Wherein the pivot pins have a radial enlargement, the radial enlargement having a diameter greater than a diameter of the pivot holes; and Wherein the side walls of the one of the lid and the base has a insertion slot, extending from an upper edge of the sidewalls of the one of the lid and the base to the pivot holes, for introducing the pivot pins into the pivot holes.

Preferably, the insertion slot is substantially V-shaped and tapers in a direction toward the pivot holes.

Advantageously, the radial enlargement is a concentric disk.

Expediently, the pivot pin has a free end adjacent to the radial enlargement whereby the free end is in the form of a bearing pin. Advantageously, the support has an abutment edge and, when the case is closed, the abutment edge rests on the bearing pin.

According to the present invention it is suggested that the length of the pivot pins is greater than the thickness of the sidewalls provided with the pivot holes. Furthermore, it is suggested that each pivot pin has a radial enlargement that has a diameter which is greater than a corresponding diameter of the pivot hole and that the sidewalls having the pivot holes are provided with insertion slots extending from the upper edge of the sidewalls to the pivot hole for introducing the pivot pin into the pivot hole.

With a case designed according to the present invention, the lid and the base are pivotable relative to one another whereby at one part of the housing (lid or base) in the area of the sidewalls pivot pins are provided and at the other part of the housing (lid or base) at the corresponding sidewalls pivot holes are provided. In contrast to the prior art, the pivot pins are no longer introduced in the axial direction into the pivot holes by providing elastically deformable sidewalls with pivot pins, but by inserting the pivot pins into the pivot holes such that they are introduced from the free upper edge of the sidewalls provided with the pivot holes into insertions slots extending downwardly into the pivot holes. Due to the radial enlargement provided at the pivot pin, it is no longer possible to remove the pivot pin in the axial direction from the pivot hole.

Accordingly, it is no longer possible in the closed position of the case in which it is secured by the tape to open the case without destroying the case.

It is furthermore advantageous that the insertion slot for the pivot pins is V-shaped. It is suggested that the V-shaped insertion slot at the upper edge of the sidewall has a width that corresponds substantially to the diameter of the pivot pin, but tapers (narrows) in the direction toward the pivot hole. By using the elasticity of the sidewall the pivot pin is thus forced in the radial direction from the free edge along the V-shaped insertion slot into the pivot hole. Due to the elasticity of the sidewall the pivot pin remains interlocked within the pivot hole and can no longer be freely removed in the upward direction.

It is understood that a plurality of alternative designs are possible; for example, a flattened pivot pin which can be inserted only in a certain position into a straight insertion slot etc. may be provided.

It is furthermore advantageous that the radial enlargement at the end of the pivot pin is a concentric disk. The concentric disk has a diameter which is greater than the diameter of the corresponding pivot hole so that the pivot pin can no longer be removed in the axial direction from the pivot hole.

Of course, instead of a disk it is also possible to provide a toggle or cam etc.

It is furthermore advantageous that the pivot pin has a free end adjacent to the radial enlargement that is in the form of a bearing pin. This extension of the pivot pin in the axial direction past the sidewall allows for an abutment edge provided at the housing to rest on the bearing pin when the case is closed. According to a further advantageous embodiment of the invention this abutment edge is provided at the support. This design also prevents that the pivot pin can be removed simply by lifting it from the pivot hole in the direction toward the free upper edge of the sidewall. Such a removal is only possible when the component at which the abutment edge is provided is in the open position.

BRIEF DESCRIPTION OF THE DRAWINGS

The object and advantages of the present invention will appear more clearly from the following specification in conjunction with the accompanying drawings, in which:

FIG. 2 shows a CD case according to FIG. 1 in an exploded view showing the three main components (lid, support, base) of the case;

FIG. 3b shows a side view according to FIG. 3a;

FIG. 5a shows a top view of a portion of the closed case;

FIG. 5b shows a side view according to FIG. 5a; and

DESCRIPTION OF PREFERRED EMBODIMENTS

The present invention will now be described in detail with the aid of several specific embodiments utilizing FIGS. 1 through 6.

Figure 1:
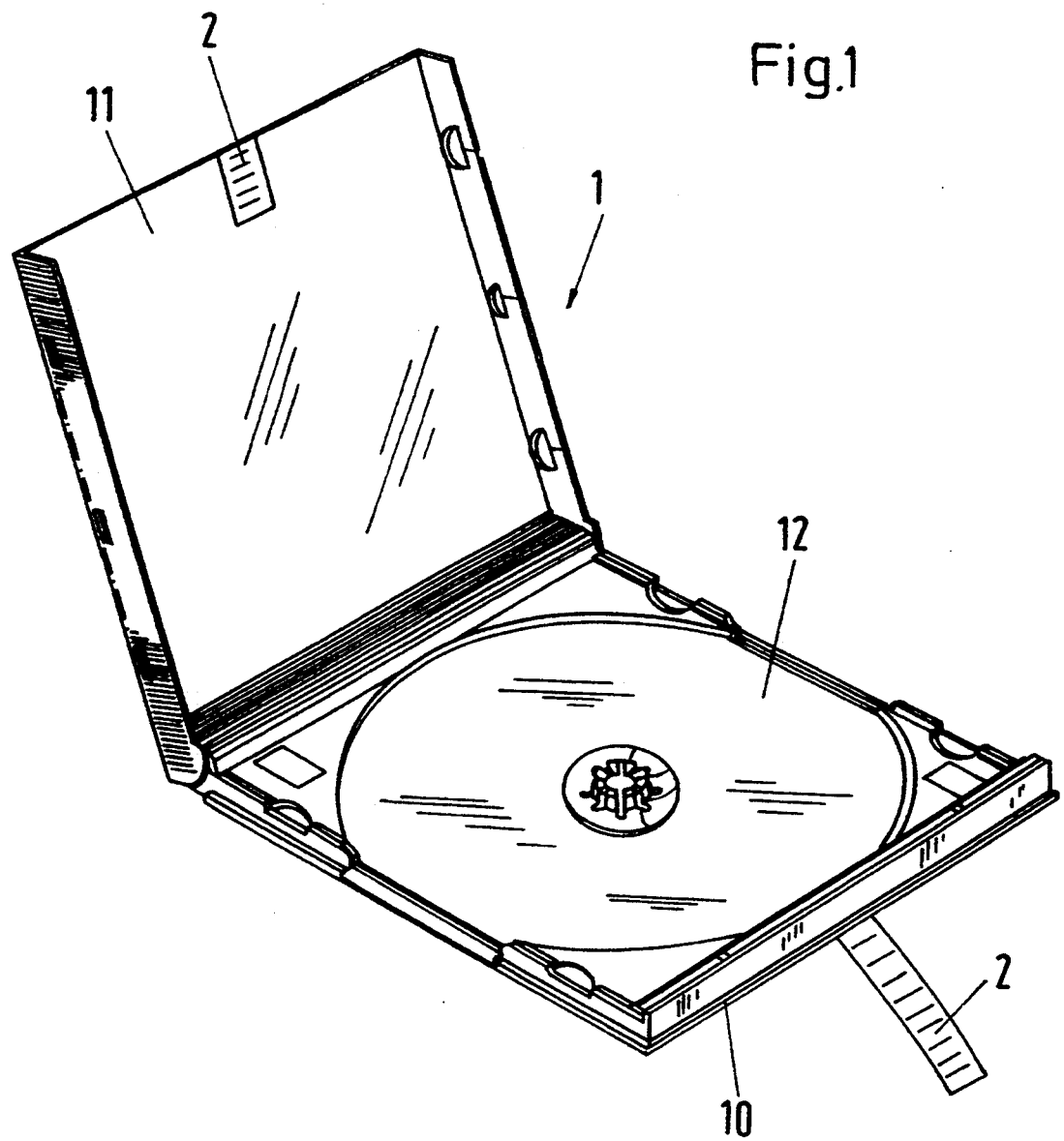
FIG. 1 shows a schematic perspective view of a mounted CD case in the open position.

The case 1 shown in FIGS. 1 and 2 is comprised of three main components: The base 10, the lid 11, and the support 12 for the data storage disk. The support 12 in the shown embodiment is connected to the base 10 at the forward end and is pivoted into the base 10 while the lid 11 is connected to the rearward end of the base 10 and is folded onto the outer side of the base 10. The closed case is secured by a tape 2, as shown in FIG. 1, such that upon closure of the case 1 it is connected to it so that only by destroying the tape the case 1 can be opened.

The base 10 shown in FIG. 2 comprises a flat, rectangular bottom plate 13, two sidewalls 14, a front wall 15, and a rearwall 16. The sidewalls 14 are provided at their center portion with cutouts 17. Along these cutouts 17 a low profile reinforcement rib 18 is provided which overlaps at the exterior of the case 1 the sidewalls 14. At the forward end (19), the rearward end (20) and adjacent to the cutouts 17 (projections 21) the sidewalls 14 extend upwardly. The projections 21 on both ends of the rib 18 are slanted in the direction toward the middle of the sidewall in order to increase the stability. The projection 21 proximal to the front wall 15 is provided with an opening 22 with guide notches for the insertion of a projection of the lid 11 in order to secure the lid 11 at the exterior of the base 10 when the case 1 is in its closed position. The projections 19 at the front wall 15 are provided with pivot holes 23 with a conical guide notch for receiving the pivot pin of the support 12 in order to be able to pivot the support 12 into the base 10. The projections 20 at the rearward end are also provided with pivot holes 24 with conical guide notches for receiving the pivot pins provided at the rear of the lid 11 so that the lid 11 is pivotable for opening and closing the case. Onto the bottom plate 13 of the base 10 a cover sheet with pictures can be positioned that is folded at the front and the rear in order to show the title of the data storage disk at the front and rear walls 15, 16 of the case. In order to protect these walls 15, 16 from scratching, they are recessed relative to the base 10. The front wall 15 is lower than the rearwall 16 in order to allow the pivoting of the support 12 by at least 180°.

The lid 11 represented in FIG. 2 is provided with a flat, rectangular top plate 25 which is substantially square because its length is smaller than that of the base 10. The top plate 25 is provided with two sidewalls 26 which at their center portion have cutouts 27 with a reinforcement rib 28 remaining. The sidewalls 26 extend to the rear past the top plate 25 of the lid 11 so as to have practically the same length as the sidewalls 14 of the base 10. These extensions form arms 29 and have pivot pins 30 for engaging the pivot holes 24 at the rearward projections 20 of the sidewalls 14 of the base 10. In order to be able to close the case, the sidewalls 14 of the base 10 are recessed relative to the bottom plate 13. The sidewalls 26 of the lid 11 thus enclose the sidewalls 14 of the base 10 and at the same time abut at the small edge of the bottom plate 13 of the base 10 which has been generated by recessing the sidewalls 14. The edge at the front end of the lid 11 is provided with a small low ledge forming the front wall 31. This small front wall 31 of the lid 11 rests on the upper edge of the front wall 15 of the base 10. The lid 11 is provided with inwardly extending tongues 32 which provide a certain free space into which a booklet with a cover having pictures can be inserted. This booklet abuts in the rear at a ledge 33 forming the back wall and substantially having the same thickness as the booklet. At the front end the booklet abuts at small conical projections 34.

The support 12 for the data storage disk, which is also represented in FIG. 2, has a rectangular plate 35 which at the center portion of the lateral sides is provided with lateral projections 36. When the case is closed, the projections 36 engage the cutouts 17, 27 of the sidewalls 14, 26 of the base 10 and the lid 11. The rearward section of the plate 35 is provided with a step 37 which, when the case is closed, rests on the upper edge of the rearwall 16 of the base 10. Due to the positioning of the step 37, the pivot connection 24, 30 of the lid 11 is unobstructed. In order to prevent a bending of the step 37 in the downward direction, for example, by pressing a finger onto its center, the step 37 at its center facing the base 10 is provided with a foot and optionally with additional vertical tongues. The step 37 furthermore is provided with two small horizontal tongues in order to prevent the downward bending of the rearward edge of the lid 11.

The support 12 for the data storage disks is provided with vertical reinforcement ribs 40, 41, 42. The forward rib 40 and the rearward rib 42, when the case is closed, extend toward the base 10, while the rib 41 extends toward the lid 11 and follows the edge of the lateral projections 36 of the plate 35. This arrangement of the reinforcement ribs 40, 41, 42 provides a considerable reinforcement of the entire support 12 and ensures a sufficient stiffness and bending resistance. Accordingly, the plate 35 of the support 12 can be produced from a thinner sheet material. For example, this thinner sheet material may have a thickness of 1.2 mm in comparison to plates of the prior art which have a thickness of 1.5 mm. This results in material savings of 20%. Furthermore, by reducing the thickness space is provided for receiving a second data storage disk.

The front end of the support 12 is also reinforced, in particular by a lower rib oriented toward the base 10 and an upper rib 48 oriented toward the lid 11. The lower rib is displaced relative to the upper rib 48 toward the center of the support 12. This displacement corresponds substantially to the thickness of the ribs 48 so that upon stacking of supports 12 the lower rib of the upper support 12 contacts the upper rib 48 of the lower support 12.

Furthermore, the rearward lower edge is reinforced by a vertical rib. These reinforcement ribs of the edges of the support 12 provide for a good bending resistance.

Also, wings 70 are shown in FIG. 2 which are arranged at the corner that is formed by the plate 35 and the lateral ribs 41 which are provided at the central portion of the lateral sides of the support. These wings 70 face the center of the support 12 and extend perpendicular to the side edges. They have a free horizontal edge 71, positioned in the same plane as the upper free end of the central ribs 41, and a free slanted edge 72 which extends from the free horizontal edge 71 to the plate 35 of the support 12.

The wings 70 are provided in order to facilitate the alignment of two supports 12 which have been laterally displaced. A simple lateral pressure onto the laterally displaced support 12 allows the lower edge of the ribs 40, 42 of the support 12 to Glide along the slanted edge 72 of the wings 70 of the lower support 12 and to align correctly on the upper edge of the central ribs 41 of the lower support 12. Without the wings 70, the ribs 40, 42 of the upper support 12 would abut at the side ribs 41 of the lower support 12.

Figure 3A:
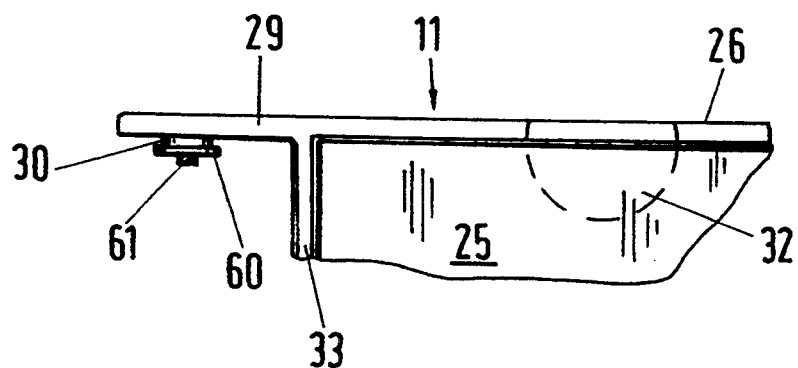
FIG. 3a shows a top view of a part of the lid.
Figure 3B:
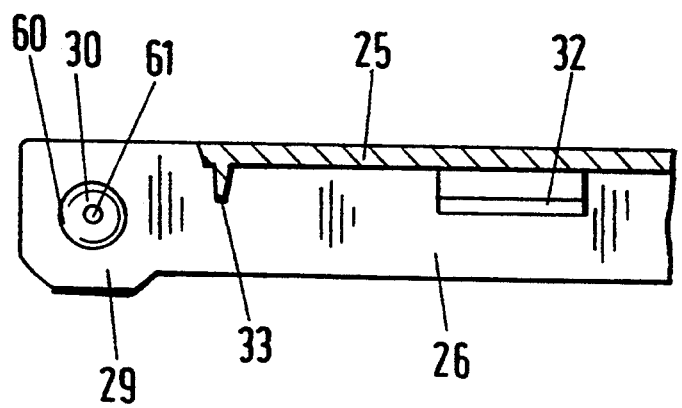

The portion of the lid 11 shown in FIG. 3a shows the inventive design of the pivot pins 30. The sidewall 26 extends to the rear and forms the elastic part (arm) 29 at which the pivot pin 30 is arranged. This pivot pin 30 is provided with a radial enlargement in the form of a concentric disk 60. Adjacent to the disk 60 a bearing pin 61 is provided at the axial free end of the pivot pin 30. It is understood that this pivot pin design can be manufactured according to any suitable conventional method. The pivot pin 30 may be comprised of individual components to be assembled or may be a one-piece injection-molded part at the lid 11. FIG. 3b shows a top view of the pivot pin 30.

Figure 4:
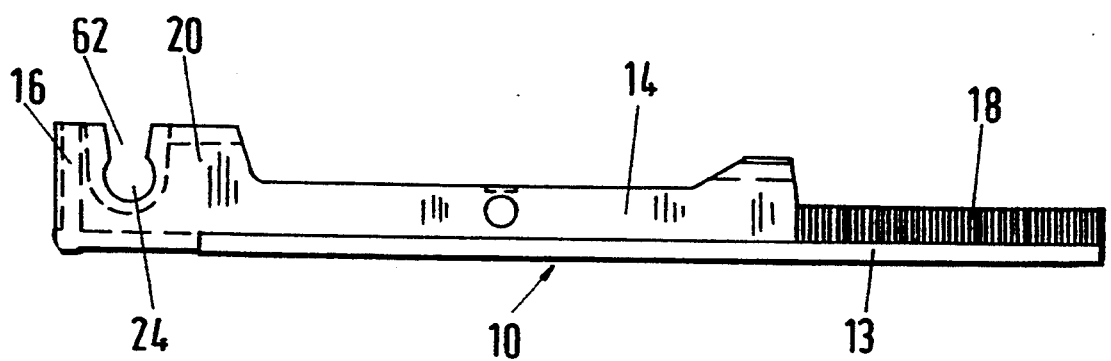
FIG. 4 shows a side view of a portion of the base.

As shown in FIG. 4 at the rearward end of the sidewall 14 of the base 10 a pivot hole 24 is formed in a conventional manner. In the shown embodiment the pivot hole 24 is a bore penetrating the sidewall 14 at its rearward projection 20. From the free upper edge of the rearward projection 20 of the sidewall 14 an insertion slot 62 extends to the pivot hole 24. In the shown embodiment this insertion slot 62 is V-shaped. At the free upper edge of the rearward projection 20 of the sidewall 14 the insertion slot 62 has a width which corresponds substantially to the diameter of the pivot pin 30. The insertion slot 62 tapers in the direction toward the pivot hole 24 so that a pivot pin 30 to be inserted is forced with elastic loading into the pivot hole 24.

FIGS. 5a and 5b show the corresponding portion of an assembled, closed case 1. The case in the shown embodiment is secured by a tape 2 which is in the form of a continuous flat band that is wound about the case 1.

The pivot pin 30 is inserted via the insertion slot 62 into the pivot hole 24. The concentric disk 60 is positioned at the inner side of the rearward projection 20 of the sidewall 14 at the base 10. Accordingly, the pivot pin 30 can no longer be displaced in the axial direction and removed from the pivot hole 24.

In the interior of the case, i.e., at the free end of the pivot pin 30, the bearing pin 61 is provided.

Figure 6:
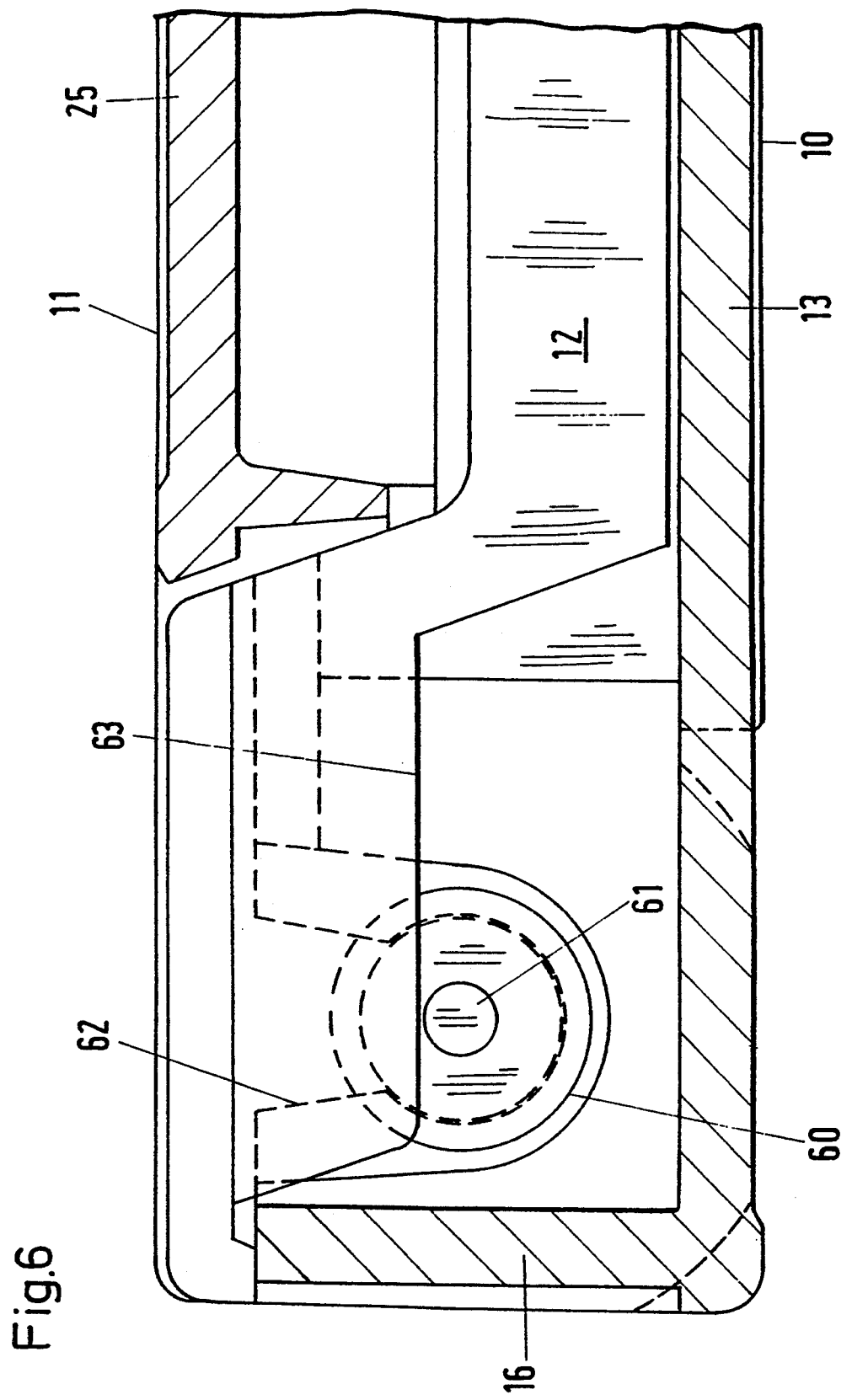
FIG. 6 shows an enlargement according to FIG. 5b of the portion of the case at which the pivot connection is embodied.

Especially the enlarged view of the pivot connection of FIG. 5b as shown in FIG. 6, illustrates that the support 12 with its abutment edge 63 rests on the bearing pin 61. With this arrangement it is no longer possible to force the pivot pin 30 out of the pivot hole 24 and through the insertion slot 62 when the case is closed. This is only possible when the case 1 is open, i.e., the lid 11 is pivoted relative to the base 10 about at least 90° and, in addition, the support 12 is pivoted away from the base 10.

With the inventive embodiment an unauthorized opening of the CD case is not possible when it is closed. Especially when a securing tape is wound about the case, a separation of lid and base within the area of the pivot pin is no longer possible without damaging the parts. This prevents the unauthorized exchange or removal of CDs.

The present invention is, of course, in no way restricted to the specific disclosure of the specification and drawings, but also encompasses any modifications within the scope of the appended claims.

What we claim is:

1. A case for receiving at least one data storage disk, said case comprising:

a housing comprised of a lid and a base;

a support, for receiving at least one data storage disk, positioned in said housing;

said base having a substantially flat rectangular bottom plate with lateral edges and sidewalls connected to said lateral edges of said bottom plate;

said lid having a substantially flat rectangular top plate with lateral edges and sidewalls connected to said lateral edges of said top plate;

said housing further comprising a pivoting connection for pivoting said lid and said base relative to one another, said pivoting connection comprised of pivot pins connected to said sidewalls of one of said lid and said base and pivot holes, for receiving said pivot pins, positioned in said sidewalls of the other of said lid and said base;

wherein a length of said pivot pins is greater than a thickness of said sidewalls of the other of said lid and said base;

wherein said pivot pins have a radial enlargement, said radial enlargement having a diameter greater than a diameter of said pivot holes; and wherein said sidewalls of said one of said lid and said base has an insertion slot, extending from an upper edge of said sidewalls of said one of said lid and said base to said pivot holes, for introducing said pivot pins into said pivot holes.

2. A case according to claim 1, wherein said insertion slot is substantially V-shaped and tapers in a direction toward said pivot holes.

3. A case according to claim 1, wherein said radial enlargement is a concentric disk.

4. A case according to claim 1, wherein said pivot pin has a free end adjacent to said radial enlargement, said free end being in the form of a bearing pin.

5. A case according to claim 4, wherein said support has an abutment edge and wherein, when said case is closed, said abutment edge rests on said bearing pin.

* * * * *